United States Patent [19]

Mortier et al.

[11] 3,949,761

[45] Apr. 13, 1976

[54] CONCAVE ADJUSTING MEANS FOR COMBINE

[75] Inventors: Frans Henri Mortier, Maldegem; Antoon Sylvain Cools, Brugge St. Kruis, both of Belgium

[73] Assignee: Sperry Rand Corporation, New Holland, Pa.

[22] Filed: Nov. 1, 1974

[21] Appl. No.: 520,173

[30] Foreign Application Priority Data

Nov. 8, 1973   Germany............................ 2355792

[52] U.S. Cl.............................................. 130/27 L
[51] Int. Cl.²........................................ A01F 12/28
[58] Field of Search ...... 130/27 L, 27 S, 27 T, 27 R

[56] References Cited
UNITED STATES PATENTS

| | | | |
|---|---|---|---|
| 3,156,245 | 11/1964 | Hobbs................................. | 130/27 L |
| 3,631,862 | 1/1972 | Rowland-Hill..................... | 130/27 L |
| 3,871,384 | 3/1975 | Depauw............................. | 130/27 L |

FOREIGN PATENTS OR APPLICATIONS

| | | | |
|---|---|---|---|
| 106,466 | 12/1942 | Sweden............................. | 130/27 L |
| 211,195 | 10/1968 | U.S.S.R............................. | 130/27 L |

*Primary Examiner*—Russell R. Kinsey
*Attorney, Agent, or Firm*—Frank A. Seemar; John R. Flanagan; Joseph A. Brown

[57] ABSTRACT

The invention comprises an improved concave supporting and adjusting mechanism for axial flow type combine harvesters wherein a supporting frame for the concave has been provided and which is adjustable in height. The concave supporting frame comprises front and rear cross bars disposed below the front and rear edges, respectively of the concave and has ends of crank arms pivotally attached thereto, the other ends of the crank arms being attached to inner ends of respective stub shafts which shafts extend through the associated side panels and which can be pivoted for adjusting the position of the supporting frame and the concave supported thereon.

13 Claims, 10 Drawing Figures

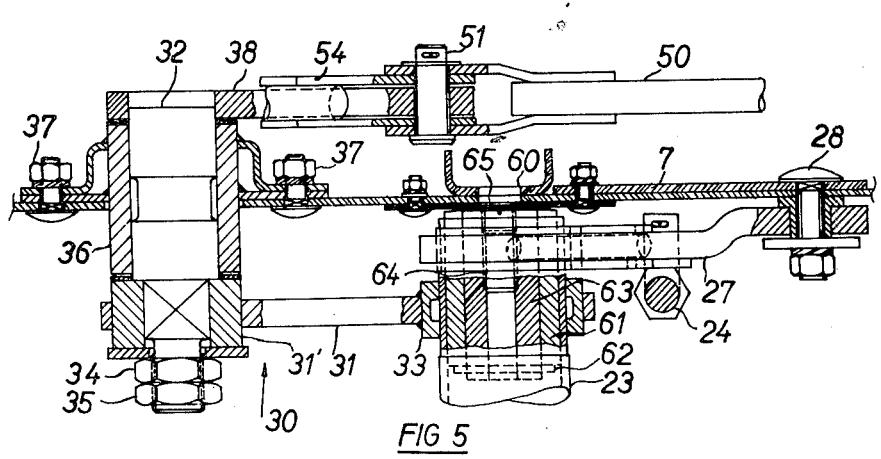
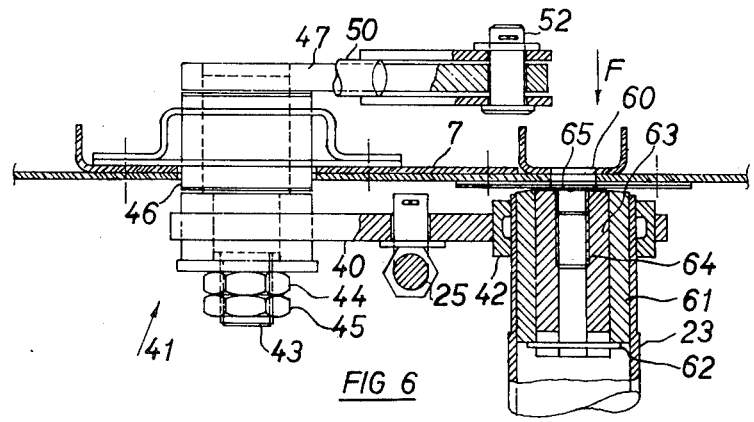
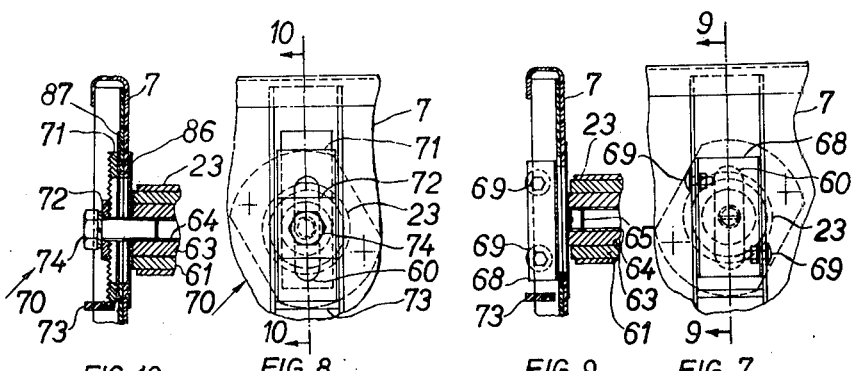

CONCAVE ADJUSTING MEANS FOR COMBINE

BACKGROUND OF THE INVENTION

1. Field of the Invention

This invention relates to axial flow threshing and separating machines and more particularly to such machines having devices for adjusting the concaves with respect to the threshing rotors.

2. Description of the Prior Art

In U.S. Pat. No. 3,631,862 assigned to Sperry Rand Corporation, there is disclosed an axial flow threshing and separating machine in which the concaves are adjusted with respect to the associated threshing rotors by cams disposed at respective ends of the concaves, rotation of the cams effecting the desired raising or lowering of the concaves relative to the threshing rotors. The cams are rotated through the use of rods and cranks, considerable force being necessary to actuate the same in the event the threshing rotors becomes jammed. Jamming can occur in combine harvesters, for example, when the crop material bunches or is fed in lumps which can happen when the crop is wet. When blockages occur, appreciable forces are exerted on the concaves and the supporting devices associated therewith. These forces give rise to high frictional resistance which must be overcome in order to rotate the cams with the consequence that, when a combine harvester is operating, it is difficult to lower the concaves relative to the threshing rotors in order to remove the blockage.

A further disadvantage of the known concave adjusting device lies in the fact that the cams and the associated supporting devices on the machine frame are subject to pronounced wear. This also applies to the longitudinal slots in the side panels of the combine harvester in which the shafts attached to the cams are carried, since considerable forces are exerted at these locations along the edges of the slots. In addition, dust and other debris may penetrate the longitudinal slots and/or block up the slots, whereby adjustment of the height of the concaves is impeded or even rendered impossible.

OBJECT OF THE INVENTION

The main object of the present invention is to provide an axial flow threshing and separating machine having an adjusting device for a concave which can be operated easily without exertion on the part of the operator.

Another object of the present invention is to provide an axial flow threshing and separating machine having an adjusting device which will remain freely operative in all crop conditions and when blockage occurs.

SUMMARY OF THE INVENTION

According to the present invention an axial flow threshing and separating machine comprises a main frame with side panels, a threshing and separating mechanism mounted on the main frame and including a casing with a rotor mounted therein, a concave cooperable with the rotor which defines part of said casing, a supporting frame for the concave adjustable in height and comprising front and rear cross bars disposed below the front and rear edges, respectively, of the concave and having ends of crank arms pivotally attached thereto, the other ends of the crank arms being attached to inner ends of respective stub shafts which shafts extend through the associated side panels; the respective stub shafts being pivotable for adjusting the position of the supporting frame and the concave supported thereon.

Preferably the concave is pivotally supported on the supporting frame at one side on axially-aligned front and rear pivot pins and at the other side by linkages, the arrangement being such that when the supporting frame is raised or lowered to adjust the concave with respect to the rotor, said other side of the concave is moved through a greater distance than said one side.

Thus there is provided an axial flow threshing and separating machine having an adjusting device for the concave, which device can be actuated effectively at any time with only minor forces involved since the crank drive operating on the crossbars of the supporting frame ensures a favourable transmission of power. The stub shafts which transmit the concave-adjusting forces can be rotated by a control system of crank arms and link rods operated by the machine operator so that the concave can be adjusted at will.

The hereinabove noted advantages, as well as others, will be apparent to those skilled in the art after a consideration of the following detailed description, taken in conjunction with the accompanying drawings in which the preferred form of the invention is illustrated.

IN THE DRAWINGS

An axial flow combine harvester in accordance with the invention will now be described in greater detail, by way of example, with reference to the accompanying drawings, in which:

FIG. 5 is a top view, partly in section, taken in the direction of the arrow B in FIG. 2.

FIG. 6 is a top view taken in the direction of the arrow D in FIG. 2.

FIG. 7 is a partial top view of the arrangement (provided with a cover-plate) according to FIG. 6 taken in the direction of the arrow F, FIG. 8 is a view, corresponding to FIG. 7, of a modification of part of the combine harvester, FIG. 9 is a section taken along the line 9—9 of FIG. 7, and FIG. 10 is a section taken along the line 10—10 of FIG. 8.

DESCRIPTION OF THE PREFERRED EMBODIMENT

Figure 1:
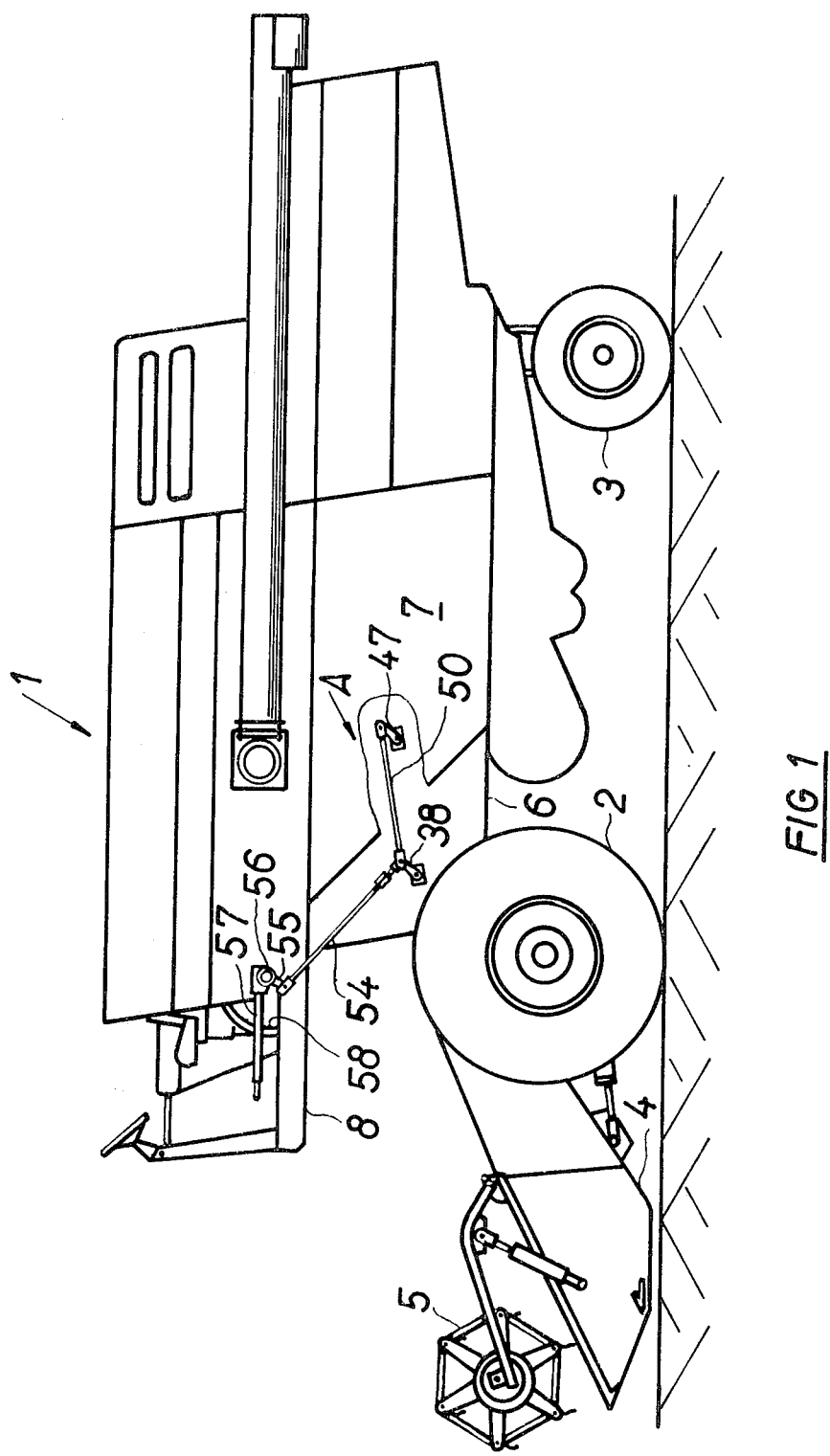
FIG. 1 is a side view of the combine harvester.

With reference to FIG. 1, the combine harvester 1 comprises forward drive wheels 2, steerable rear wheels 3, a front mowing unit or header 4 with a reel 5, a main frame 6 with side panels 7, and a driver position 8. Two threshing and separating mechanisms 9 (FIGS. 2–4) are provided and in the region thereof, the side panels 7 have openings 10 which are normally closed by plates (not shown) and which make easy access to the threshing and separating mechanisms 9 possible. The threshing and separating mechanism 9 includes a pair of rotors 11, with associated casings not shown, disposed in side-by-side relation and extending generally longitudinally in the direction of travel of the combine casing disposed fore-and-aft of the harvester. Each rotor is provided with rasp bars 12 which cooperate with respective concaves 13 which extend substantially parallel beneath the rotors 11. The concaves 13 are adjustably suspended by mechanism 14, whereby it is possible to maintain the concaves 13 in a selected relationship with respect to the rotors 11.

Each concave 13 includes a plurality of threshing bars 15 extending longitudinally of the harvester, and a plurality of transversely curved rods 16 which extend through apertures in the bars 15. Each concave 13 further comprises front and rear curved support members 17. At the adjacent sides of the concaves 13, the support members 17 are carried on pivot pins 19 fastened to front and rear intermediately-disposed supports 20 of subframe 21. The subframe 21 is of H-shape configuration with parallel transverse front and rear crossbars 23 and longitudinal central bar 22. Subframe 21 lies beneath rotors 11 and associated concaves 13 and is disposed totally between and within the vertical side panels 7.

Figure 2:
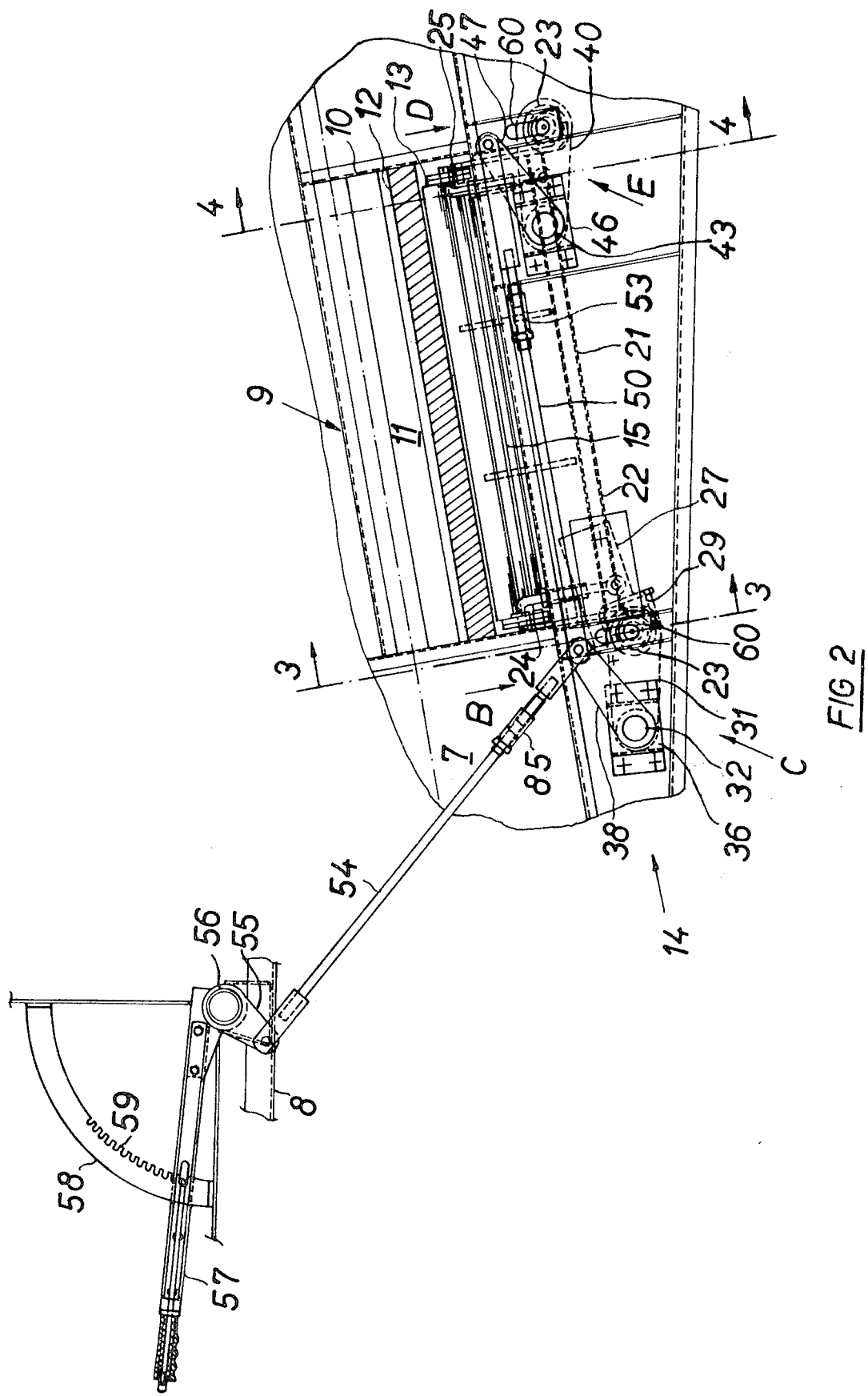
FIG. 2 shows part A of FIG. 1 on an enlarged scale and in longitudinal section.
Figure 3:
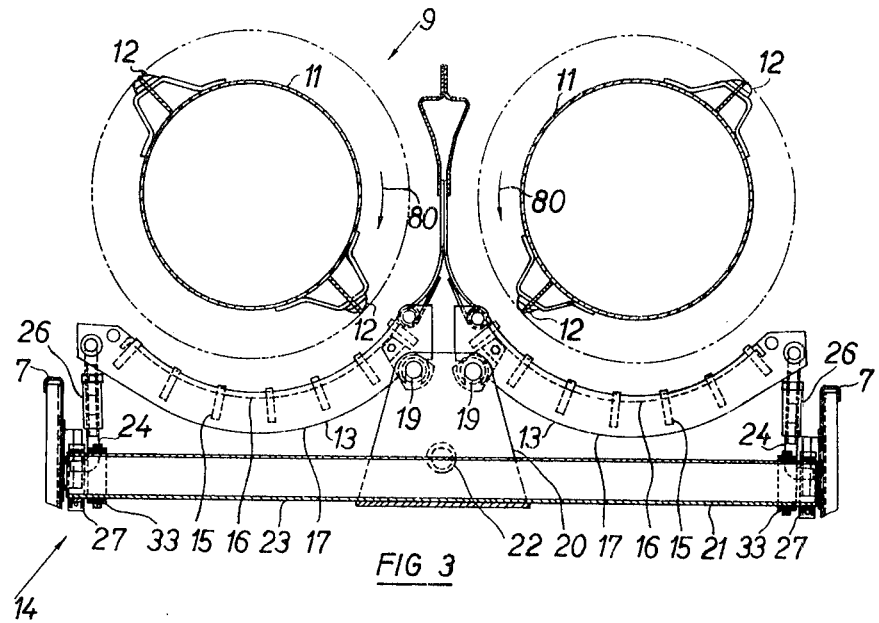
FIG. 3 is a section taken along the line 3—3 of FIG. 2, in which the concaves are located in their lowermost positions.
Figure 4:
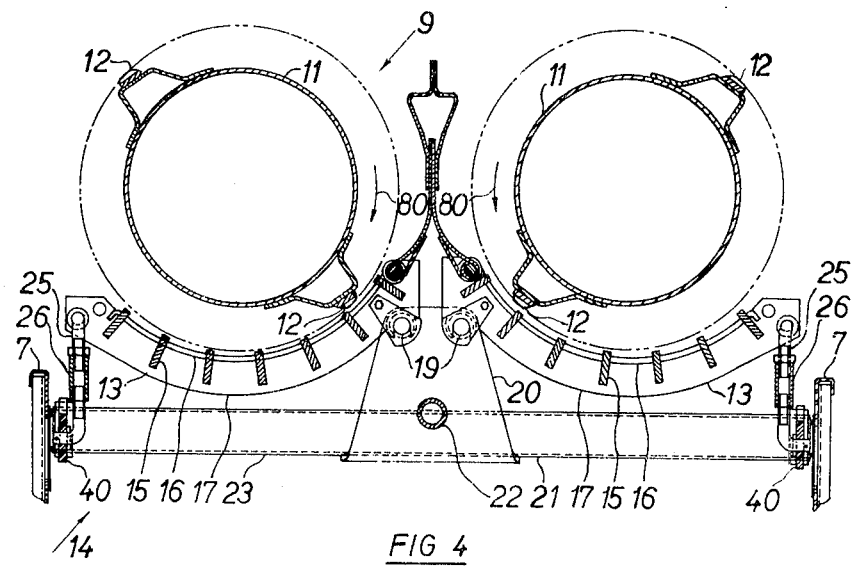
FIG. 4 is a section taken along the line 4—4 of FIG. 2, in which the concaves are located in their highest positions.

The outer edges of the concaves 13 are supported, as seen in FIGS. 2, 3 and 4, by front and rear pivotal support linkages 24 and 25, respectively, the length of which is adjustable by turnbuckles 26. With their lower ends angled to fit, the support linkages 24 are pivotally attached intermediate the ends of substantially horizontal connecting members 27 which are pivotally mounted on the inner side of the corresponding side panel 7 (FIG. 5). The horizontal connecting members 27 have one end rotatable about horizontal pivot pins 28, and at their other end slidably mounted on the adjacent ends of the associated crossbar 23 by means of the recesses 29 (FIG. 2) on said members 27.

Towards each end of the front crossbar 23 is mounted a pivotal connecting member means 30 comprising a crank arm 31 fastened at one end to a stub shaft 32 via a collar 31. The other end of the arm 31 is attached to a bushing 33 fitting on the crossbar 23. Each arm 31 is fastened to the associated stub shaft 32 by a nut 34 and a lock nut 35. The stub shafts 32 extend through respective bushes 36 bolted at 37 to respective side panels 7. Each stub shaft 32 has attached to its outer end, which is outside of the associated side panel 7, a crank arm 38 (FIGS. 2 and 5).

Each rear support linkage 25 (FIGS. 4 and 6) is pivotally attached at the lower end intermediately the ends of a crank arm 40 of a connecting means 41. Each arm 40 carries at one end a bushing 42 which fits on the adjacent end of the rear crossbar 23 to allow relative pivotal movement of the arms 40 relative to the frame 21.

As seen in FIG. 6, the arms 40 are fastened by nuts 44 and lock nuts 45 to respective stub shafts 43 supported in bushes 46 attached to the associated side panel 7. Each stub shaft 43 has attached to its outer ends, which is outside the associated side panel 7, a crank arm 47.

The front arms 38 and the rear arms 47 are linked together on either side of the combine harvester by substantially horizontal rods 50 which transmit the pivotal movement of the front arms 38 to the rear arms 47. The link rods 50 are pivotally attached by pivot pins 51 and 52 to the arms 38 and 47, respectively, and extend beneath the lower edge of the respective openings 10 and comprise turnbuckles 53 to adjust their length.

An actuating means consisting of link rods 54 are pivotally attached at one end by the pivot pins 51 to the arms 38 and extend forwards and upwards in the direction of the driver station 8. These link rods 54 likewise comprise turnbuckles 85 to adjust their length. The other ends of the link rods 54 are pivotally attached to respective crank arms 55 which are attached to a shaft 56 arranged transversely of the machine. Also attached to the shaft 56 is a conventionally designed handle 57 which is retained in a selected position by engagement of a part thereof with one of a plurality of detents 59 provided in an arcuate member 58.

The crossbars 23 terminate at the inner surfaces of the adjacent side panels 7 and the latter are formed, in the area of termination, with elongated slots 60 (FIGS. 2 and 5, 6). The crossbars 23 are of tubular construction and have internal bushes 61 welded in place to each end, the inner end of each bush being fitted with stop means 62. Within each is a slideable slug 63 having a threaded bore 64 that receives sealing screw 65 which prevents dust and dirt from getting into the threaded bore 64. The stop means 62 locates the slug 63 in the end of crossbar 23 and prevents slug 63 from rotating within bush 61 when the sealing screw 65 or bolt 74 is tightened into threaded bore 64. The slots 60 are provided with cover plates 68 which are secured by nuts and bolts 69 to the U-shaped member of side panel 7. Cover plates 68 prevent the blockage of dust and debris within slots 60 which would thereby impede the operation of the adjustment mechanism 14 (see FIGS. 5–7).

If the concaves 13 have to be attached rigidly to the side panels 7 once they have been adjusted relative to the rotors 11, such as when harvesting corn, then the sealing screws 65 and the cover-plates 68 are removed and replaced by fastening means 70 as shown in FIGS. 8 and 10. The means 70 comprise members 71 and 72 which are milled or knurled on cooperating faces to provide anti-vibration fastenings. A bolt 74 passes through the members 71 and 72 into the threaded bore 64 of the associated slug member 63 and on being tightened, it pulls the member 63 into engagement with a plate 86 abutting the inside surface of the corresponding side panel 7 and pressing the member 71 into engagement with a plate 87 abutting the external surface of the panel 7, whereby the concave 13 is firmly attached to the main frame 6. Each member 71 is located by a stop 73. All the forces exerted on the concaves 13 are transmitted to the machine frame via the members 63 and fastening means 70.

OPERATION

When the combine harvester is assembled, the rotors 11 and concaves 13 are positioned in the threshing mechanism. Normally, the concaves 13 have to be located relative to the rotors 11 in such a way that in the direction of rotation 80 (FIGS 3, 4) the space between each concave 13 and associated rotor 11 decreases. In other words, the distance between the rotors 11 and respective concaves 13 tapers in the direction of rotation 80 of the rotors 11. This is desirable in order to provide favorable crop feed-in properties followed by a gradually increasing threshing effect as the distance between the rasp bars 12 and concaves decreases.

In order to ensure the presence of these optimum operational characteristics, a certain degree of pre-adjustment of the concaves 13 is necessary. The concaves 13 are raised to their highest position and adjusted so as to be substantially parallel to the respective rotors 11 using the turnbuckles 26. The concaves 13 are lowered to the requisite operating position by moving the handle 57. Through the special arrangement of the concave adjusting mechanism 14 which includes the H-shaped subframe 21, the inner and outer edges of the concaves 13 are raised and lowered together with the inner edges being moved a greater distance than the outer edges. Upon lowering the concaves, the inner sides of the concaves are lowered more than the outer sides. This results in the required decreasing gap in the direction of rotation 80 of the rotors 11, and the further the concaves 13 are lowered, the more pronounced the decreasing gap becomes.

Under certain circumstances it may be necessary for the gap between the rotors 11 and the concaves 13 in the direction of rotation 80 to be made to increase rather than decrease. This is, for example, the case with crop material that can only be threshed with great difficulty and initially necessitates an extremely aggressive threshing action. With this requirement in view, a further concave pre-setting facility is provided, according to which the concaves 13 are first of all brought to their lowest position in which they are adjusted so as to be substantially parallel to the respective rotors 11. From the foregoing description, it will be appreciated that now the gaps between the rotors 11 and the concaves 13 will increase in the direction of rotation 80 of the rotors 11 if the concaves are raised into the desired position. It will further be appreciated that any other desired concave pre-setting can be achieved between the two extremes described.

By use of the turnbuckles 85 and 53, or of similar devices, it is very simple to adjust the H-shaped frame 21 so that the concaves 13 are substantially parallel to the respective rotors 11, this being so both in the longitudinal direction of the machine and in the transverse direction. It is also possible, with the aid of the turnbuckles 53, to adjust the concaves 13 in such a way that the gaps between the concaves and the rotors 11 gradually decrease in the longitudinal direction, with the consequence that in this direction also, a squeezing effect can be achieved should this be appropriate bearing in mind the type of crop material or the ripeness or moisture content thereof. After the concaves 13 have been pre-set, it is a matter of the utmost simplicity for the operator to make subsequent adjustments to the position of concaves relative to the respective rotors 11 taking into consideration conditions prevailing at the time and to remedy any blockages that might occur.

If the concaves 13 have, for example, to be raised, the lever 57 is pulled upwards which pivots the connecting means 30 and 41 with the consequence that the associated arms 31 and 40 are raised, which in turn raises the subframe 21 carrying the concaves. The inner and outer edges of the concaves 13 are raised simultaneously although by differing amounts as already explained.

If for any reason the rotors 11 become jammed as a result of the gaps between the concaves 13 and the respective rotors 11 being choked with crop material, then clearance is normally very simple, the concaves 13 being moved down to their lowest position, by moving the handle 57 to the FIG. 2 position. The drive to the rotors 11 is then re-instated whereby the clogging mass of crop material is passed through and discharged from the threshing mechanism 9.

The described combine harvester is also advantageous inasmuch as the side panels 7 do not normally have openings therein that might be blocked by debris to the extent that the efficiency of the concave supporting mechanism may be impaired or the mechanism rendered inoperative. Those components of the concave suspension mechanism that extend through the panels 7 only need to be able to pivot and to not require linear mobility.

Furthermore, all the components of the concave suspension mechanism that are of any appreciable length are subject to tensile loading rather than to buckling stresses. The concave suspension mechanism operates extremely reliably because of the likelihood of blockage is remote and because no components are subject to excessive loading and wear, for example by reason of point contact. Pre-adjustment of the concaves 13 can also be effected very easily.

If under certain conditions, for instance when corn is being harvested, relatively large forces on the concaves are anticipated, it is practical to clamp the concaves 13 rigidly in relation to the main frame 6 after setting the concaves in an appropriate position to harvest corn. This clamping action can be affected very easily by the arrangement shown in FIGS. 8 and 10, it being necessary merely to remove the sealing screws 65 and coverplates 68 and to insert the elements 71, 72 and the screws 74.

Finally, the large openings 10, and the arrangement of link rods 50 below the lower ends of the openings 10, facilitate completely unimpeded access to the threshing mechanism 9, which is of considerable importance if the concaves 13 have to be repaired, replaced or adjusted.

It will be appreciated that the invention is applicable to threshing and separating machines having a single threshing rotor as well as to machines having a plurality of rotors.

Having described the preferred embodiment of the invention it will be understood that various changes in the details and arrangements of parts, which have herein been described and illustrated in order to explain the nature of the invention, may be made by those skilled in the art within the principle and scope of the invention as expressed by the appended claims.

What is claimed is:

1. A mobile axial flow threshing and separating machine comprising:
 a. a main frame with side panels;
 b. at least one concave extending longitudinally within the side panels;
 c. at least one threshing and separating rotor mounted to said frame within said side panels, the threshing and separating rotor cooperating with the concave to remove grain from incoming crop material;
 d. front and rear pairs of stub-shafts rotatably mounted about respective transverse axes, each of which extends through a portion of one of said side panels, the inner end of each of said stub-shafts of said front pair being disposed adjacent the front edge of said concave, the inner end of each of said stub-shafts of said rear pair being disposed adjacent the rear edge of said concave,
 e. means for supporting said concave, said means being disposed totally within and between said side panels and being operably connected to the inner ends of said stub-shafts; and
 f. actuating means connected to the outer end of at least one of said stub-shafts adjacent the exterior surface of one of said side panels and operable to rotate said stub-shafts to effect vertical adjustment of the position of said concave relative to said rotor.

2. A mobile axial flow threshing and separating machine, as set forth in claim 1, wherein, said supporting means includes means for positioning one side of said concave in a position closer to said rotor than the other side of said concave.

3. A mobile axial flow threshing and separating machine, as set forth in claim 1, wherein, said supporting means includes means for positioning the rear edge of said concave in a position closer to said rotor than the front edge of said concave.

4. A mobile axial flow threshing and separating machine, as set forth in claim 1, wherein, said supporting means comprise:
 a longitudinally extending crank arm mounted to the inner end of each of said stub-shafts, the crank arms of each pair of stub-shafts project towards respective front and rear edges of said concave; and
 linkage means operably connected to said crank arms for supporting said concave in a cooperating position with said rotor.

5. A mobile axial flow threshing and separating machine, as set forth in claim 4, wherein, the linkage means comprise:
 a subframe disposed between said side panels, said subframe including front and rear transversely extending crossbars terminating adjacent interior surfaces of said side panels, the ends of each of said crossbars being mounted to the crank arms of respective front and rear stub-shafts such that said crossbars move with the pivotal movement of said crank arms upon rotation of said stub-shafts by said actuating means; and
 a longitudinally extending connecting member disposed at each end of one of said crossbars and being operable with said subframe to support said concave, said connecting member having one end pivotally mounted to a respective side panel and its other end slideably attached to said crossbar so that said connecting member pivots about its pivotal axis as said crossbar pivots about the transverse axis of said respective stub-shaft.

6. A mobile axial flow threshing and separating machine, as set forth in claim 1, further comprising:
 a connector rod connecting the front and rear pairs of stub-shafts for the simultaneous rotation thereof by said actuating means.

7. A mobile axial flow threshing and separating machine, as set forth in claim 6, wherein the actuating means comprise:
 a control handle mounted on said frame in the vicinity of the operator's station;
 a second crank arm mounted to the outer end of each of stub-shafts along the exterior surface of said side panel; and
 a connector means connecting said control handle to one of said second crank arms;
 said connector rod connecting said second crank arm on one side of said machine whereby actuation of said control handle causes said front and rear pairs of stub-shafts to rotate simultaneously and thereby vertically adjust the position of said concave relative to said rotor.

8. A mobile axial flow threshing and separating machine comprising:
 a. a main frame with side panels;
 b. a pair of fore-and-aft extending rotors mounted on said main frame in adjacent side-by-side relation;
 c. at least two longitudinally extending concaves disposed within said side panels and being operable with said rotors to thresh and separate grain from crop material;
 d. front and rear pairs of stub-shafts mounted for rotation about respective transverse axes, each of said stub-shafts extend through one of said side panels, the inner ends of each pair of stub-shafts being disposed in the proximity of respective front and rear ends of said concave;
 e. means for supporting said concaves in cooperating positions with respect to said respective rotors, said means being disposed totally within and between said side panels, said means being operably connected to the inner ends of said stub-shafts for positioning the adjacent sides of said concaves a distance further away from their respective rotors than the distance between the outer edges of said concaves relative to their respective rotors; and
 f. actuating means connected to the outer ends of one of said stub-shafts along the exterior surface of said side panel to rotate said stub-shafts for vertical adjustment of said concaves relative to said rotors.

9. A mobile axial flow threshing and supporting machine as set forth in claim 8, wherein, said supporting means includes means for positioning the rear edges of said concaves a distance closer to said rotors than the distance between the front edges of said concaves relative to said rotors.

10. A mobile axial flow threshing and separating machine, as set forth in claim 8, further comprising:
 at least one connector rod connecting the front stub-shafts to the rear stub-shafts for simultaneous rotation thereof by said actuating means.

11. A mobile axial flow threshing and separating machine, as set forth in claim 8, wherein, the means for supporting said concaves comprise:
 a subframe disposed between said side panels, said subframe including front and rear transversely extending crossbars corresponding respectively to the front and rear ends of said concaves, said subframe further including longitudinally extending crank arms connecting said front and rear stub-shafts with respective front and rear crossbars; and
 a connecting member pivotally mounted at one end thereof on said side panels adjacent respective ends of one of said crossbars, the other end of said connecting member being slideably mounted on said crossbar, said connecting member pivots about its axis as said crossbar is pivoted about the axis of said stub-shafts.

12. A mobile axial flow threshing and separating machine, as set forth in claim 11, wherein, the outer front edges of said concaves are pivotally interconnected to respective connecting members, the outer rear edges of said concaves are pivotally interconnected to respective crank arms, and the adjacent inner edges of said concaves are pivotally interconnected to respective front and rear crossbars.

13. A mobile axial flow threshing and separating machine as set forth in claim 8, wherein, said actuating means comprise:
 a control handle mounted on said main frame in the vicinity of the operator's station;
 a second crank arm mounted to the outer end of each of said stub-shafts along the exterior surface of said side panels;
a connector rod connecting the second crank arms on each side of said machine; and
a connector means connecting said control handle to one of said second crank arms;
actuation of said control handle rotates said stub-shafts such that said concaves are vertically adjusted relative to said rotors by the movement of said subframe and said connecting members.

* * * * *